Feb. 24, 1942.  A. T. GORMAN  2,273,952

BRAKE RELEASE CONTROL MEANS

Filed Aug. 31, 1939

INVENTOR
ANDREW T. GORMAN
BY
ATTORNEY

Patented Feb. 24, 1942

2,273,952

UNITED STATES PATENT OFFICE 2,273,952

BRAKE RELEASE CONTROL MEANS

Andrew T. Gorman, Pitcairn, Pa., assignor to The Westinghouse Air Brake Company, Wilmerding, Pa., a corporation of Pennsylvania Application August 31, 1939, Serial No. 292,855

34 Claims. (Cl. 303—57)

This invention relates to locomotive fluid pressure brake equipment for controlling the application and release of the brakes on a train of cars, and more particularly to means for controlling the charging and recharging of the equipment.

The usual type of locomotive brake equipment comprises a main storage volume, such for instance as one or more main reservoirs, a brake pipe, a feed valve device, a brake controlling valve device and an engineer's automatic brake valve device.

The engineer's brake valve device is provided with a release position in which the main storage volume containing fluid under pressure at higher than normal brake pipe pressure is directly connected to the brake pipe. The brake valve device is also provided with a running position, in which fluid under pressure is supplied from the main reservoir to the brake pipe through the feed valve device, the setting of the feed valve device determining the normal brake pipe pressure.

In initially charging, and in recharging the equipment to effect the release of the brakes, it is customary to first move the engineer's brake valve to release position, in which fluid under pressure is supplied directly from the main reservoir to the brake pipe and then, after a desired predetermined interval of time has elapsed, the brake valve is turned to running position, in which fluid at feed valve pressure is supplied to the brake pipe.

The initial supply of fluid at high pressure to the brake pipe rapidly increases the brake pipe pressure on the cars at the head end of the train. This high head of pressure at the front end of the train is adapted to cause a rapid flow of fluid under pressure toward the rear of the train so as to accelerate the release of the brakes and the charging of the brake equipment on the cars at the rear end of the train. However, the increased pressure in the brake pipe at the forward end of the train is partially absorbed by air passing to the auxiliary reservoirs on the forward cars for the purpose of recharging the same.

It is intended that in initially charging a train, the handle of the engineer's brake valve device will be manipulated in the above manner. However, in some cases, such as in the operation of short freight trains or in passenger train service where trains are much shorter, the handle of the brake valve device is left in release position a much shorter period than is the practice in long freight train service. In order to effect a release of the brakes after an application on a short train, the brake valve handle is initially turned to running position instead of release position. In order to effect a release of the brakes after an application on a long train of from say seventy-five to one hundred and fifty cars, the time in which the brake valve handle is permitted to remain in release position is dependent upon the brake pipe reduction. It has been considered good practice that in order to avoid overcharging the equipment on the forward cars of the train the brake valve handle should be permitted to remain in release position one second for each pound reduction in brake pipe pressure, the maximum time in release position being generally limited to fifteen seconds.

Therefore, the engineer must exercise considerable caution, for if the handle of the brake valve device is permitted to remain in release position for too long an interval of time before moving it to running position, the equipment, and particularly the auxiliary reservoirs on the forward cars of the train, become overcharged, that is, charged to a pressure above the pressure normally carried in the brake pipe. Now, when the brake valve handle is returned to running position the pressure of fluid supplied to the brake pipe will drop from the pressure carried in the main reservoir to the pressure setting of the feed valve device. This change in pressure of the fluid supplied will result in a rapid fall of pressure in the brake pipe at the front end of the train, as occasioned by leakage from the brake pipe and also by equalization of pressure from the head to the rear of the train. This change in pressure may cause the brakes at the front end of the train to apply when it is desired that they be released, if the auxiliary reservoirs have been charged to a pressure above the equalized pressure in the brake pipe.

The principal object of the present invention is to provide a locomotive brake equipment of the above mentioned type with means whereby the danger of objectionable overcharge of the equipment is eliminated.

Another object of the present invention is to eliminate the ill effects of excessive and at present mechanically unlimited use of full main reservoir pressure in release position of the automatic brake valve device.

Still another object of the invention is to provide an equipment with means cut into or out of operation according to brake pipe pressure and operative in charging or recharging to control the supply of a measured quantity of fluid at a predetermined pressure in excess of the pressure normally carried in the brake pipe.

The above objects are attained in the present embodiment of the invention by the use of a reservoir of a certain volume to be charged to a certain pressure in excess of the normal brake pipe pressure. The volume of the reservoir and excess pressure established therein are calculated to produce automatically in a train of from say seventy-five to one hundred and fifty cars, substantially the same prompt releasing action obtained by the usual manual operation of the engineer's brake valve device, without however the attendant ill effects accompanying the manual operation of that device.

A further object of the invention is to provide means automatically operative to render available a measured amount of air at excess pressure for effecting a more prompt release of the brakes and recharging the brake pipe pressure for long train operation, and also operative to prevent use of an excess pressure in effecting a release of the brakes in short train operation.

The present standard No. 8ET locomotive brake equipment, such as described for example in The Westinghouse Air Brake Company's Instruction Pamphlet No. 5032-1, dated 1936, includes a pneumatically controlled delay valve device. The delay valve device is adapted to operate when an emergency reduction in brake pipe pressure is initiated to control the rate of increase in the locomotive brake cylinder pressure, so that it will not exceed the rate of increase in brake cylinder pressure on the cars of the train. On a short train where the train slack is not very great and its rapid gathering or closing will not cause damaging shocks, the delay valve may be rendered ineffective, and to do this a manually operated delay cock is provided. This cock is readily accessible to the engineer for controlling the operation of the delay valve for selectively rendering it effective or ineffective dependent upon the length of the train.

When the brake pipe charging control means embodied in this invention is employed in connection with the No. 8ET locomotive brake equipment, it is contemplated that it will be interlocked with the delay valve so that when the train length justifies the locomotive brake equipment being conditioned for controlling brake cylinder pressure build up during an emergency application, the excess pressure control means will automatically be available for recharging the brake pipe.

Other objects and advantages will appear in the following more detail description of the invention.

In the accompanying drawing

Figures 1, 2, 3:
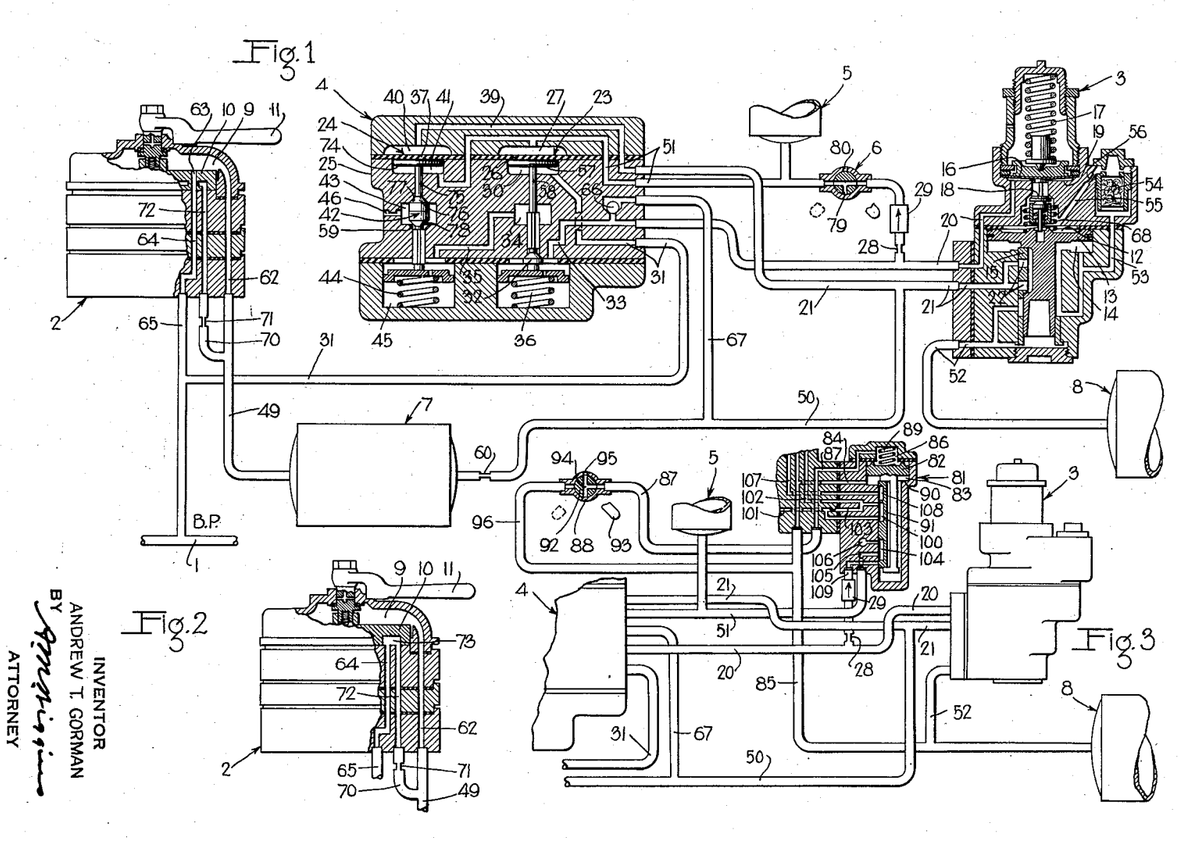
Fig. 1 is a diagrammatic view mainly in section of a fluid pressure brake apparatus embodying one form of the invention.
Fig. 2 is a diagrammatic view mainly in section showing connections established where the engineer's automatic brake valve device is in running position.
Fig. 3 is a diagrammatic view partially in section showing a modification of the invention.

As shown in Fig. 1 of the drawing, the equipment may comprise a brake pipe 1, an engineer's automatic brake valve device 2, a feed valve device 3, an excess pressure valve device 4, a pressure retaining volume 5, a cut out cock 6, a train line supply reservoir 7 which may be the second or third main reservoir in the present standard locomotive equipment and a first or second main reservoir 8.

Considering now more in detail the devices referred to above briefly, the automatic brake valve device 2 may be of the usual construction and comprises a casing having a chamber 9 therein in which is mounted a rotary valve 10 operated by means of a handle 11.

The feed valve device 3 may also be of standard construction and is preferably of large capacity and of the remote control type. It may comprise a casing having a piston chamber 12 containing a piston 13 and a valve chamber 14, in which is disposed a slide valve 15. The piston 13 is subject on one side to pressure of fluid in chamber 14 and on the other side to pressure of fluid in chamber 12 and to pressure of a spring 68. Chambers 12 and 14 are in communication by way of passage 55 containing restriction 56, strainer 54 and passage 53.

The regulating portion of the feed valve device may comprise a flexible diaphragm 16, subject on one side to the pressure of an adjustable coil spring 17 and adapted to control the operation of a valve 18 interposed between the piston chamber 12 and a chamber 19 at the opposite side of the diaphragm 16.

The diaphragm chamber 19 is open to a passage and pipe 20 called the feed valve control pipe which leads to the excess pressure valve device 4. A feed valve supply pipe and passage 21 leads from the seat of the slide valve 15 to the excess pressure control valve device 4 and has a branch 50 which leads to the train line reservoir 7.

The slide valve 15 is provided with large capacity ports 22 adapted in the feed position of the slide valve to register with corresponding ports leading to the feed valve supply pipe 21.

The excess pressure control valve device 4, which is provided for the purpose of controlling the pressure of the fluid in the train line reservoir 7 in long train operation after a predetermined reduction in brake pipe pressure, comprises a cut in valve and a cut out valve, indicated generally by numerals 23 and 24 and assembled as a unit in a casing 25. The cut in valve 23 may comprise a flexible diaphragm 26 having on one side a diaphragm chamber 27 connected to the feed valve control pipe 20 by a pipe and passage 51 through a choke 28, a one way check valve 29 and a cut out cock 6, which is closed for short train operation and open for long train operation. The diaphragm 26 has at its opposite side a chamber 30 connected to a passage and pipe 31 leading to the brake pipe 1. The diaphragm 26 is adapted to operate a valve 32 which is adapted to control communication between a passage 33 connected to the feed valve control pipe 20 and a chamber 34 open to a passage 35 leading to the cut out valve 24. The valve 32 is normally biased toward its seated or closed position by a spring 36, as shown in the drawing.

The cut out valve 24 may comprise a flexible diaphragm 37 subject to the opposing fluid pressures in a diaphragm chamber 40 which is connected to the feed valve supply pipe 21 by a passage 39 and in a chamber 41 connected to the feed valve control pipe 20 by way of pipe 51. The diaphragm is adapted to operate a double beat valve 42 which is contained in a chamber 43 and is normally urged toward its upper seated position by the pressure of a spring 44 disposed in a chamber 45. The valve 42 in this position is adapted to maintain communication from the passage 35 through chamber 43 and a restricted exhaust passage 46 to the atmosphere.

The purpose of the retaining volume 5 is to add volume to the diaphragm chambers 27 and 41, respectively, of the excess pressure valve device 4.

The cut out cock 6 is provided for cutting in or cutting out the excess pressure valve device 4 and is of usual construction, having a through passage adapted to be opened or closed and an atmospheric connection adapted to vent one side of the passage when the cock is closed.

The purpose of the choke 28 is to prevent uncontrolled action of the feed valve device when initially cutting the excess pressure control valve device into service along with the uncharged retaining volume 5.

The purpose of the uni-directional flow check valve 29 is to retain pressure in the retaining volume 5 at the time the control pipe 20 is vented, as will be more fully explained hereinafter.

The train line reservoir 7 is intended to be supplied with fluid under pressure at either the pressure normally carried in the brake pipe or at a pressure in excess of the pressure normally carried in the brake pipe, and is located between the brake valve device 2 and the feed valve device 3 and is connected to the brake valve device 2 by a pipe 49 and to the feed valve device 3 by the pipes 50 and 21.

Operation

Let it be assumed that the brake equipment is uncharged, that the brake valve device 2 is in its release position, and that the cock 6 is in a position establishing communication between the feed valve device 3 and the excess pressure valve device 4, which is in the position for long train operation, as shown in Fig. 1 of the drawing.

Under the above assumed conditions the cut in and cut out valves 23 and 24 of the excess pressure control valve device 4 will be in the positions shown in the drawing, due to the action of the springs 36 and 45, respectively.

With the system uncharged spring 68 will hold piston 13 and its slide valve 15 in their lowermost position, where communication between the slide valve chamber 14 and pipe and passages 21 will be cut off.

In initially charging the equipment under these conditions, the main reservoir 8 on the locomotive is supplied with fluid under pressure in the usual manner and fluid under pressure from this main reservoir flows through a pipe and passage 52 to the slide valve chamber 14 of the feed valve device 3.

Fluid under pressure thus supplied to chamber 14 flows to chamber 12 by way of passage 55 at a restricted rate, so that the preponderate pressure in chamber 14 causes the piston 13 and attached slide valve 15 to move to the position in which they are shown in the drawing. In this position the ports 22 in the slide valve 14 register with the supply ports leading to the feed valve supply pipe 21. Fluid under pressure from the main reservoir 8 and the connected feed valve chamber 14 is thus supplied to pipe 21 and thence flows to the train line reservoir 7, by way of pipe 50, through a choke 60 which is just slightly less in area than the equivalent orifice capacity of the feed valve device. The purpose of the choke is to eliminate any tendency of erratic action by the feed valve device 3.

Since the system is being initially charged with fluid under pressure the feed valve control pipe and passage 20 connected to the diaphragm chamber 19 will be devoid of fluid under pressure, so that the diaphragm 16 will be operated by the spring 17 to move the valve 18 from its seat. When the valve 18 is unseated the piston chamber 12 is connected to diaphragm chamber 19 and fluid under pressure flows from the chamber 12 to the feed valve control pipe 20, past unseated valve 18.

From the train line reservoir 7 fluid is supplied by way of pipe 49 and a passage 62 to the rotary valve chamber 9 of the automatic brake valve device 2. With the rotary valve 10 of the automatic brake valve in release position, as shown in Fig. 1 of the drawing, fluid under pressure in chamber 9 flows through a large unrestricted port 63 and passage 64 to a pipe 65 and therefrom to the brake pipe 1. Fluid under pressure supplied to pipe 65 also flows through branch pipe and passage 31 to the chamber 30 at the lower side of the cut in valve diaphragm 26 in the excess pressure control valve device 4.

Fluid under pressure supplied to feed valve supply pipe 21 also flows therefrom to passage 39 and thence flows to chamber 40 at the upper side of the cut out valve diaphragm 37 in the excess pressure control valve device 4.

With the feed valve device in the position shown fluid under pressure is supplied to the feed valve control pipe 20, as above described, and flows therefrom to the passage 33 which leads to the lower face of the cut in valve 32, which valve is closed at this time by action of spring 36. Fluid under pressure in passage 33 also unseats and flows past ball check valve 66 into a pipe 67 and thence to the feed valve supply pipe 50 leading to the train line reservoir 7. Fluid under pressure supplied to the feed valve control pipe 20 also flows therefrom through choke 28, check valve 29 and cock 6 to branch pipe and passage 51, to the retaining volume 5 and to the cut in and cut out valve diaphragm chambers 27 and 40 respectively. Since the chambers 27 and 30, and the chambers 40 and 41 at opposite sides of the diaphragms 26 and 37, respectively, are thus charged at substantially the same time and with the same degree of pressure, the cut in and cut out valves 23 and 24 remain in the position shown in the drawing.

By supplying fluid under pressure through the unobstructed passage of large capacity directly from the train line reservoir 7 to the brake pipe 1, the brake pipe pressure is rapidly increased to the pressure normally carried in the brake pipe, as determined by the adjustment of the adjusting spring 17 in the feed valve device 3. When the pressure in the brake pipe and in the diaphragm chamber 19 of the feed valve device 3 have been increased to the adjusted pressure, the diaphragm 16 is operated so as to permit the valve 18 to seat. Fluid pressure in chambers 12 and 14 then equalizes through passage 53, strainer 54, restricted port 56 and passage 55. The equalization of pressure on either side of piston 13 permits spring 68 to move the piston 13 and attached slide valve 15 to their lower position, where the supply of fluid from the slide valve chamber 14 to the feed valve control pipe 21 is cut off.

When the equipment is fully charged the handle 11 of the automatic brake valve device is turned to running position, as shown in Fig. 3 of the drawing. In this position the large capacity port 63 is lapped and direct unrestricted flow of fluid from the train line reservoir 7 is closed off. Fluid under pressure may however flow from the train line reservoir 7 to the brake pipe by way of pipes 49 and 70, through a choke 71 and a passage 72, a cavity 73 in the rotary valve 10 and passage 64 and pipe 65, to maintain the pressure in the brake pipe which may drop as occasioned by leakage. The flow of fluid under pressure through choke 71 from the train line reservoir to the brake pipe in running position of the brake valve is at the same capacity as is at present supplied through the well known "M" type feed valve used in conjunction with the present standard types of locomtive equipment, such as either the No. 6ET or No. 8ET locomotive brake equipments.

The return of the automatic brake valve handle from release position to running position when the equipment is fully charged is required in order to insure that an emergency application of the brakes will be effected upon a break-in-two near the front of the train while running over the road.

It may be noted, however, that it is not necessary to move the brake valve handle from release position to running position after some predetermined interval of time in order to avoid overcharging of the equipment, but it need only be moved to running position when the equipment is fully charged and the train is running over the road.

*Long train operation, service application*

When it is desired to initiate a service application of the brakes on a long train, the handle of the automatic brake valve device is turned to service position, in which fluid under pressure is released from the brake pipe to the atmosphere at a service rate, to effect an application of the brakes in the usual well known manner. Upon a reduction in the pressure of fluid in the brake pipe, the pressure in chamber 30 at the lower side of the cut in valve diaphragm 26 is consequently reduced. When the pressure in the brake pipe and in the chamber 30 has been reduced to approximately ten pounds below the normal pressure carried in the brake pipe, the pressure of fluid at normal brake pipe pressure present in chamber 27 at the opposite side of the diaphragm 26 overcomes the pressure of spring 36 and causes the diaphragm 27 to deflect downwardly from the position viewed in the drawing. Downward movement of the diaphragm acting through the medium of a diaphragm follower 57 and a stem 58 causes the valve 32 to move away from its seat. With the valve 32 unseated communication is established between passage 33 and chamber 34, which is at this time open to the atmosphere by way of passage 35, chamber 45, past valve seat 59, chamber 43 and restricted passage 46.

With this communication established feed valve control pipe 20, and consequently diaphragm chamber 19 of the feed valve device 3, are connected to the atmosphere. However, it should be noted that the uni-directional flow check valve device 29 interposed between the pipe 20 and reservoir 5, and connected chambers 27 and 41, prevents back flow from these latter volumes. Therefore, when the control pipe 20 is connected to the atmosphere, fluid under pressure in said reservoir and said chambers is retained at the pressure normally carried in the brake pipe.

The reduction of pressure in chamber 19 causes the regulating spring 17 to unseat valve 18, thus causing the feed valve device to assume its feed position, as shown in the drawing. When this occurs fluid under pressure flows from valve chamber 12 to the feed valve supply pipe 21 and therefrom by way of pipe 50 to the train line reservoir 7. Fluid under pressure supplied to pipe 21 also flows to passage 39 leading to the diaphragm chamber 40 at one side of the diaphragm 37 of the cut out valve 24. The flow of fluid under pressure thus supplied to the train line reservoir 7 and to chamber 40 continues until the pressure is increased to a degree sufficient to overcome the combined opposing action of the pressure in chamber 41 at the opposite side of the diaphragm 37 and the spring 44. When the pressure in the train line reservoir 7 and consequently in the chamber 40 has been increased to approximately fifteen pounds above the pressure in the chamber 40, and in the retaining volume 5, the diaphragm 37 is deflected downwardly. Downward movement of the diaphragm 37 causes the double beat valve 42 to move to its opposite seated position, that is away from its seat 77 into seating engagement with its seat 59, thus cutting off communication between chambers 45 and 43. This results in terminating the venting of the feed valve control pipe 20. With this venting communication closed the pressure of fluid supplied to the control 20 rapidly increases and consequently increases also in the diaphragm chamber 19 of the feed valve device 3. When this pressure has increased to the setting of the regulating spring 17, the feed valve device operates to cut off the supply of fluid under pressure from the slide valve chamber 14 to the feed valve supply pipe 21.

When a reduction in brake pipe pressure of less than ten pounds is made to effect a light application of the brakes on the train, the excess pressure control valve device 4 is inoperative. With less than a ten pound reduction in brake pipe pressure the pressure in chamber 30 connected thereto is reduced less than ten pounds. Therefore the fluid under pressure at normal brake pipe pressure in chamber 27 at the opposite side of the diaphragm 26 is insufficient to overcome the opposing action of the pressure in chamber 30 and spring 36. Under these conditions the diaphragm 27 and the valve 32 remain in the position shown, so that fluid under pressure at normal brake pipe pressure is maintained in the train line reservoir.

It will be observed however, that whenever ten pounds or greater reduction in brake pipe pressure is effected the train line reservoir 7 will be overcharged, the degree of the overcharge above normal brake pipe pressure being a predetermined amount above the normal pressure carried therein.

*Recharging the equipment to release the brakes after an application*

When it is desired to recharge the equipment and effect a release of the brakes on a long train, the handle 11 of the brake valve device is turned to release position. In this position communication is established between the train line reservoir 7 and the brake pipe 1, as hereinbefore described under initial charging of the equipment, and the train line reservoir 7 will discharge its excess pressure into the brake pipe, thereby effecting a rapid increase of pressure in the brake pipe which will cause a quick release of the brakes. This release of the brakes is effected solely by the fluid pressure at excess pressure from the train line reservoir 7 and not by air delivered from the main reservoir. The communication between the main reservoir and the train line reservoir 7 is cut off at this time by the feed valve device. Therefore, the initial release of the brakes will be accomplished without any reduction of pressure in the main reservoir. However, it should be noted that due to the limited amount of excess pressure available in the train line reservoir and to the volume of the brake pipe to be recharged, no excess pressure will be available when the equipment at the front end of the train is fully charged. Under these conditions it will be evident that the equipment cannot become overcharged.

The discharge of excess pressure from the train line reservoir 7 of course effects a reduction of pressure therein during the initial release of the brakes. Such a reduction in pressure in said reservoir may continue until the pressure therein is reduced to a value slightly below the normal pressure carried. When this occurs the higher pressure in the feed valve control pipe 20 flows therefrom to the train line reservoir 7, the communication being by way of passage 33, past ball check valve 66, and pipes 67 and 21, whereupon the pressure in chamber 19 of the feed valve device 3 is reduced and the regulating spring 17 operates to open valve 18. With the valve 18 open, the piston 13 and attached slide valve 15 are moved to their feed position and fluid under pressure is delivered from the main reservoir 8 to the train line reservoir 7, as before described, to replenish the system to the normal pressure setting of the feed valve device.

It will now be evident that the release of the brakes and the recharging of the brake system is automatically accomplished merely by disposing the brake valve handle in release position until the system is fully charged to the pressure normally carried therein. When the system is fully charged the brake valve is returned to running position in which position it is carried while running over the road.

When it is desired to recharge the equipment and release the brakes after a light application, that is, after a reduction in brake pipe pressure of less than ten pounds, the brake valve handle 11 is moved to release position, thereby establishing communication between the train line reservoir 7 and the brake pipe, as before described.

Fluid under pressure is then supplied through an unobstructed passage of large capacity directly from the reservoir 7 to the brake pipe at such a rate as to insure the prompt release of the brakes throughout the train. The train line reservoir is made of sufficient volume to provide for prompt recharge of the brake pipe and of the auxiliary reservoirs throughout the train, without the need of excess pressure and without danger of overcharging the equipment.

Short train operation

In some cases, such as in the operation of short freight trains or in passenger train service where trains are relatively short, the handle of the cock 6 is turned from the position shown to a position indicated in dotted lines in the drawing. With the cock in this position communication between the feed valve control pipe 20 and the retaining volume 5 and connected chambers 27 and 41 in the excess pressure control valve device 4, is cut off and the reservoir and the diaphragm chambers are connected to the atmosphere. The communication from the chambers 27 and 41 and the retaining volume 5 to the atmosphere is established by way of pipe 51 and passage 79 which registers with an atmospheric port 80 in this position of the cock 6. With the diaphragm chambers 27 and 41 connected to the atmosphere, the pressure therein is vented and the cut in and cut out valves 23 and 24 are rendered ineffective.

Under these conditions when it is desired to initially charge the equipment fluid under pressure is supplied from the main reservoir to the brake pipe in substantially the same manner as described under initially charging a long train.

Now, as before described, when fluid under pressure is supplied to the brake pipe it also flows by way of pipe and passage 31 to the diaphragm chamber 30. Since the chamber 27 at the opposite side of the diaphragm 26 is maintained connected to the atmosphere by cock 6 in short train operation, the pressure thus supplied to chamber 30 performs no function and the cut in valve 32 is maintained closed, as shown in the drawing, by action of the spring 36. Similarly, chamber 41 at one side of diaphragm 37 is connected to the atmosphere and chamber 40 at the opposite side of the diaphragm is supplied with fluid under pressure at train line reservoir pressure, as before described. When the pressure in chamber 40 increases to approximately fifteen pounds the diaphragm is deflected, thereby moving the double beat valve 42 to its lowermost position thus cutting off communication between the control pipe 20 and the atmosphere, where said valve is maintained and performs no function.

With the cock 6 closed, and a reduction in brake pipe pressure of any degree made in the usual well known manner, to effect an application of the brakes, the feed valve device 3 will operate to maintain the train line reservoir 7 charged only to the pressure setting of the feed valve device 3. Therefore with the cock 6 positioned for short train operation, that is closed, the excess pressure control valve device 4 will be rendered inoperative and at no time will the train line reservoir 7 be charged above the setting of the feed valve device, that is, the pressure normally carried in the brake pipe.

When it is desired to recharge the equipment and effect a release of the brakes on a short train, the handle 11 of the brake valve device is turned to release position and allowed to remain therein until the equipment is fully charged, when it is moved to running position, thus rapidly charging the equipment to the pressure normally carried therein in the same manner as described under initial charging.

Modified form of invention

In Patent 2,009,841, Serial No. 733,181, issued July 30, 1935, to E. E. Hewitt, there is disclosed a brake equipment which is substantially like that at present employed on locomotives. In this equipment there is provided a delay valve device which is employed when the engine is hauling long trains to delay the application of brakes on the locomotive and thereby prevent too rapid build up of brake cylinder pressure on the locomotive which might result in too rapid run-in of the slack in the train. When short trains are being hauled this delay valve device is conditioned to provide for a fast application of the brakes on the locomotive. It will therefore be evident that since this delay valve device has two positions, one of which is employed only for long train operation, while the other is employed only for short train operation, the functions of the cut out cock 6 in Fig. 1 may be incorporated therein to provide the same results as above described. Therefore the cock 6 may be dispensed with and for it may be substituted a structure as shown in Fig. 3 of the drawing, wherein the feed valve device 3 and the excess pressure valve device 4 are shown associated with a delay valve device indicated by the reference numeral 81. This delay valve device is substantially like that shown and described in the aforementioned patent, except modified according to the invention to contain two additional pressure ports and a vent port.

Only those parts of the delay valve device are however shown which are pertinent to the present invention. As shown, the delay valve device comprises a body having a bore therein in which is mounted a piston 82 having at one side thereof a valve chamber 83, which chamber is constantly connected to the main reservoir 83 by way of a passage 84 and pipes 85 and 52.

The piston 82 has at the other side thereof a chamber 86 which is connected through a passage and pipe 87 to a manually operable control valve device 88 which is a part of the standard locomotive equipment. A spring 89 is mounted in the chamber 86 and yieldingly urges the piston 82 downwardly, as viewed in the drawing, to a position opposite to which the piston is shown, in which it engages a shoulder 90 on the body of the valve device.

The piston 82 has a stem formed integral therewith which operates a slide valve 91 mounted in the chamber 83 and adapted to control communication with certain ports in the seat of the slide valve as will hereinafter more fully appear.

The manually operable control valve device 88 may comprise a casing, a plug valve 92 rotatably mounted in the casing and a handle 93 for rotating the valve. With the plug valve in the position shown in Fig. 3, the pipe 87, and consequently the piston chamber 86 of the delay valve, are connected to the atmosphere through a passage 94 in the plug valve and a registering port 95 in the casing. When the handle 93 is turned to the position as shown by dotted lines in Fig. 3, the plug valve closes the communication from the pipe 87 to the atmospheric port 95 and establishes communication with a pipe 96 which is connected to the main reservoir 8 by way of pipes 85 and 52.

When the locomotive is employed to haul a short train the handle 93 of the manually controlled valve device 88 is moved to the position shown and chamber 86 of the delay valve device 81 is connected to the atmosphere, as described. The piston 82 and attached slide valve 91 are then moved to the non-delay position against the spring 89 by the higher pressure of the fluid in the chamber 83, as shown in the drawing. In this position a cavity 104 establishes a communication between a passage 105 and a vent port 106. The passage 105 is connected to a pipe 51 which is arranged to establish the same connections as the pipe indicated by the same numeral in Fig. 1 of the drawing. Therefore, from the foregoing it may be seen that when the delay valve device 81 is positioned for short train operation to effect a rapid application of the brakes, the excess pressure control valve device 4 is automatically rendered inoperative.

When the locomotive is employed to haul a long train where slack in the train is sufficient to cause harsh dangerous shocks, the handle 93 of the manually operated valve device 88 is rotated to the position indicated by dotted lines. With the handle in this position the communication from the pipe 87 and consequently from the piston chamber 86 of the delay valve device 81 to the atmosphere is cut off. Further communication is now established between the main reservoir 8 and chamber 86, so that fluid under pressure flows from the main reservoir to the piston chamber 86. The pressure thus supplied is at a pressure substantially equal to the pressure in the chamber 83 at the opposite side of the piston 82, so that the spring 89 acts to shift the piston and thereby the slide valve 91 to their innermost position. With the slide valve 91 in this position it interrupts the communication between passage 105 and the vent port 106 and cavity 104 connects the passage 105 to a passage 109, which passage is connected to the feed valve control pipe 20, through check valve 29 and choke 28. With this communication established it will be evident that with the delay valve device 81 positioned for long train operation to govern the rate of brake application on the locomotive, the excess pressure control valve device 4 will be automatically cut in to function during release operation as fully described in connection with Fig. 1.

While the delay valve device performs other functions than those described, as evidenced by the presence of the other ports and passages shown, these form no part of the present invention and are therefore not described in detail.

It will be seen from the foregoing that an improved locomotive brake equipment has been provided with means whereby the danger of objectional overcharge of the equipment is eliminated.

While two embodiments of the improved locomotive brake equipment have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake system, in combination, a brake pipe, a reservoir adapted to be charged with fluid under pressure to a normal degree, a brake valve device for controlling charging of said brake pipe from said reservoir and also controlling reductions of pressure in said brake pipe to effect applications of the brakes, and means operatively responsive to brake pipe pressure only when brake pipe pressure is reduced to or below a chosen value lower than the pressure normally carried in the brake pipe for charging said reservoir to a pressure higher than said normal degree.

2. In a fluid pressure brake system, in combination, a brake pipe, a reservoir, means for maintaining said reservoir charged with fluid at a chosen pressure value, means for charging said brake pipe from said reservoir following a reduction in brake pipe pressure, and means responsive to a predetermined reduction in brake pipe pressure for charging said reservoir with fluid at a pressure higher than said chosen pressure value.

3. In a fluid pressure brake system, in combination, a brake pipe, a reservoir, an engineer's brake valve device operative in a brake applying position to reduce brake pipe pressure and operative in a brake releasing position to charge the brake pipe from said reservoir, and means for maintaining said reservoir normally charged with fluid at a chosen pressure and responsive to a predetermined reduction in brake pipe pressure to charge said reservoir with fluid to higher than said chosen pressure.

4. In a fluid pressure brake system, in combination, a brake pipe, a reservoir, an engineer's brake valve device operative in one position to effect a reduction in brake pipe pressure to apply the brakes and operative in another position to charge the brake pipe from said reservoir to release the brakes, pressure control means operative to maintain said reservoir charged with fluid at a chosen pressure, and means responsive to a predetermined reduction in brake pipe pressure for causing said pressure control means to charge said reservoir with fluid at higher than said chosen pressure.

5. In a fluid pressure brake system, in combination, a brake pipe, a reservoir, an engineer's brake valve device operative in a brake applying position to reduce the pressure in the brake pipe to apply the brakes and operative to a brake releasing position to charge the brake pipe from said reservoir to release the brakes, means operative to maintain said reservoir charged with fluid at a given pressure, means responsive to a predetermined degree of reduction in brake pipe pressure for causing fluid to be supplied to said reservoir at higher than said given pressure, and means for effecting termination of the supply of fluid by said last means to said reservoir when the pressure of fluid therein is a predetermined degree above said given pressure.

6. In a fluid pressure brake system, in combination, a brake pipe, a reservoir, means for maintaining said reservoir charged with fluid at a chosen pressure value, means for charging said brake pipe from said reservoir following a reduction in brake pipe pressure, and means responsive to a predetermined reduction in brake pipe pressure for charging said reservoir with fluid at a pressure higher than said chosen pressure value, and means for selectively rendering said last means operative or inoperative.

7. In a fluid pressure brake system, in combination, a brake pipe, a reservoir, means for maintaining said reservoir charged with fluid at a chosen pressure value, means for charging said brake pipe from said reservoir following a reduction in brake pipe pressure, and means responsive to a predetermined reduction in brake pipe pressure for charging said reservoir with fluid at a pressure higher than said chosen pressure value, and means operative as incidental to conditioning of the brake system for long or short train operation for rendering said last means effective or ineffective.

8. In a fluid pressure brake system, in combination, a brake pipe, a reservoir, an engineer's brake valve device operative in one position to effect a reduction in brake pipe pressure to apply the brakes and operative in another position to charge the brake pipe from said reservoir to release the brakes, pressure control means operative to maintain said reservoir charged with fluid at a chosen pressure, and means responsive to a predetermined reduction in brake pipe pressure for causing said pressure control means to charge said reservoir with fluid at higher than said chosen pressure, and means operative when conditioning the brake system for long train operation for rendering said last means effective and operative when conditioning the brake system for short train operation for rendering said last means ineffective.

9. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having at least two positions, one for reducing brake pipe pressure and the other position for connecting said train line reservoir to said brake pipe for charging the brake pipe, means controlling the supply valve and operative to effect the operation thereof to limit the pressure of fluid supplied to the train line reservoir to a predetermined degree less than in the main reservoir, and other means for controlling the supply valve and operative to limit the pressure of fluid supplied to the train line reservoir to a degree a chosen amount greater than said predetermined degree, said other means being controlled by brake pipe pressure and being rendered operative upon a reduction in brake pipe pressure exceeding a predetermined degree.

10. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having a brake application position for reducing brake pipe pressure and a release position for connecting said train line reservoir to said brake pipe for charging the brake pipe, means controlling the supply valve and operative to effect the operation thereof to limit the pressure of fluid supplied to the train line reservoir to a predetermined degree less than in the main reservoir, and other means for controlling the supply valve to effect charging of the train line reservoir to a predetermined pressure less than in the main reservoir and greater than normal brake pipe pressure with the brake valve device in said application position.

11. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having a brake application position for reducing brake pipe pressure and a release position for connecting said train line reservoir to said brake pipe for charging the brake pipe, means controlling the supply valve and operative to effect the operation thereof to limit the pressure of fluid supplied to the train line reservoir to a predetermined degree less than in the main reservoir, and other means responsive to a given reduction in brake pipe pressure effected by the brake valve device for also controlling the supply of fluid under pressure from the main reservoir to the train line reservoir.

12. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having a brake application position for reducing brake pipe pressure and a release position for connecting said train line reservoir to said brake pipe for charging the brake pipe, means controlling the supply valve and operative to effect the operation thereof to limit the pressure of fluid supplied to the train line reservoir to a predetermined degree less than in the main reservoir, and other means for controlling the supply valve and operative upon a predetermined reduction in brake pipe pressure for effecting the operation of the supply valve to supply fluid under pressure to the train line reservoir and operative when the train line reservoir is charged to a pressure less than in the main reservoir and greater than said predetermined pressure to cut off the supply of fluid under pressure to said train line reservoir.

13. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having a brake application position for reducing brake pipe pressure and a release position for connecting said train line reservoir to said brake pipe for charging the brake pipe, means controlling the supply valve and operative to effect the operation thereof to limit the pressure of fluid supplied to the train line reservoir to a predetermined degree less than in the main reservoir, and other means comprising a cut in and a cut out valve for controlling the supply valve, said cut in valve being operative upon a predetermined reduction in brake pipe pressure for effecting the operation of the supply valve to supply fluid under pressure to the train line reservoir, and said cut out valve being operative when the train line reservoir is charged to a pressure less than in the main reservoir and greater than said predetermined pressure to effect cut off of the supply of fluid under pressure to said train line reservoir.

14. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having a service position for reducing brake pipe pressure and a release position for connecting said train line reservoir to said brake pipe for charging the brake pipe, a regulating valve device responsive to the pressure of fluid in the train line reservoir and normally operative upon a predetermined increase therein to effect operation of the supply valve to cut off the supply, and a valve device comprising a pair of movable abutments, one of which is operative upon a reduction in brake pipe pressure below a predetermined degree for rendering said regulating valve inoperative to cut off said supply at said predetermined pressure and the other movable abutment being operative to effect operation of said regulating valve device to cut off said supply when a pressure below the pressure in the main reservoir and above said predetermined pressure has been established in said train line reservoir.

15. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having at least two positions, one for reducing brake pipe pressure and the other position for connecting said train line reservoir to said brake pipe for charging the brake pipe, means controlling the supply valve and operative to effect the operation thereof to limit the pressure of fluid supplied to the train line reservoir to a predetermined degree less than in the main reservoir, and other means for controlling the supply valve and operative to limit the pressure of fluid supplied to the train line reservoir to a degree a chosen amount greater than said predetermined degree, said other means being controlled by brake pipe pressure and being rendered operative upon a reduction in brake pipe pressure exceeding a predetermined degree, and a valve device having two positions adapted to selectively render said other means effective or ineffective.

16. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having a brake application position for reducing brake pipe pressure and a release position for connecting said train line reservoir to said brake pipe for charging the brake pipe, means controlling the supply valve and operative to effect the operation thereof to limit the pressure of fluid supplied to the train line reservoir to a predetermined degree less than in the main reservoir, and other means for controlling the supply valve to effect charging of the train line reservoir to a predetermined pressure less than in the main reservoir and greater than normal brake pipe pressure with the brake valve device in said application position, and a manually operated valve device adapted to selectively render said other means effective or ineffective.

17. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having a brake application position for reducing brake pipe pressure and a release position for connecting said train line reservoir to said brake pipe for charging the brake pipe, means controlling the supply valve and operative to effect the operation thereof to limit the pressure of fluid supplied to the train line reservoir to a predetermined degree less than in the main reservoir, and other means comprising a cut in and a cut out valve for controlling the supply valve, said cut in valve being operative upon a predetermined reduction in brake pipe pressure for effecting the operation of the supply valve to supply fluid under pressure to the train line reservoir, and said cut out valve being operative when the train line reservoir is charged to a pressure less than in the main reservoir and greater than said predetermined pressure to effect cut off of the supply of fluid under pressure to said train line reservoir, and a manually operated valve device adapted to selectively render said other means effective or ineffective.

18. In a locomotive brake equipment, in combination, a main reservoir normally charged with fluid under pressure, a train line reservoir adapted to be charged with fluid at a reduced pressure from said main reservoir, a feed valve device for controlling the supply of fluid under pressure from the main reservoir to the train line reservoir, a brake pipe, a brake valve device having one position for reducing brake pipe pressure and another position for connecting said train line reservoir to said brake pipe for charging the brake pipe, said feed valve device comprising a supply portion for controlling the supply of fluid under pressure to the train line reservoir and a regulating portion subject to the pressure of fluid in the train line reservoir for controlling the operation of said supply portion to limit the pressure of fluid supplied to the train line reservoir to a predetermined degree less than in the main reservoir, and means responsive to a predetermined reduction in brake pipe pressure effected by the brake valve device for controlling the regulating portion for effecting the operation of the supply valve to first supply and then cut off the supply to the train line reservoir when it is charged to a pressure less than in the main reservoir and greater than said predetermined degree.

19. In a fluid pressure brake system, in combination, a brake pipe, a reservoir, means for maintaining said reservoir charged with fluid at a chosen pressure value, means for charging said brake pipe from said reservoir following a reduction in brake pipe pressure, and means responsive to a predetermined reduction in brake pipe pressure for charging said reservoir with fluid at a pressure higher than said chosen pressure value, and a delay valve device for controlling the rate of application of the brakes on the locomotive and having two positions, said delay valve being operative in one position to render said other means effective and being operative in its other position to render said other means ineffective.

20. In a locomotive brake equipment, in combination, a main reservoir normally charged with fluid under pressure, a train line reservoir adapted to be charged with fluid at a reduced pressure from said main reservoir, a supply valve for controlling the supply of fluid under pressure from the main reservoir to the train line reservoir, a brake pipe, a brake valve device having a brake application position for reducing brake pipe pressure and a release position for connecting said train line reservoir to said brake pipe for charging the brake pipe, means controlling the supply valve and operative to effect the operation thereof to limit the pressure of fluid supplied to the train line reservoir to a predetermined degree less than in the main reservoir, a valve having an open and a closed position and operative when in open position to also control the supply valve for charging the train line reservoir to a predetermined pressure less than in the main reservoir and greater than normal brake pipe pressure, a movable abutment for controlling said valve and operative upon a predetermined reduction in brake pipe pressure to open said valve, and means operative when the reduction in the brake pipe pressure becomes a selected amount greater than said predetermined reduction to effect closing said valve.

21. In a locomotive brake equipment, in combination, a main reservoir normally charged with fluid under pressure, a train line reservoir adapted to be charged with fluid at a reduced pressure from said main reservoir, a brake pipe, a brake valve device having an application position for reducing brake pipe pressure and a release position for connecting said train line reservoir to said brake pipe for charging the brake pipe, valve means operative upon a reduction in pressure in a chamber to supply fluid under pressure from the main reservoir to the train line reservoir, means for supplying fluid under pressure to said chamber, said chamber being connected through a communication to said train line reservoir for providing at one time an increase in pressure in said chamber with that in said train line reservoir, control means responsive to a predetermined increase in pressure in said chamber to operate the valve means to cut off the supply of fluid under pressure to the train line reservoir, and means operative upon a reduction in brake pipe pressure exceeding a certain degree to vent fluid under pressure from said chamber and upon an increase in pressure in the train line reservoir exceeding said predetermined degree but below that in the main reservoir to close the vent from the chamber.

22. In a locomotive brake equipment, in combination, a main reservoir normally charged with fluid under pressure, a train line reservoir adapted to be charged with fluid at a reduced pressure from said main reservoir, a brake pipe, a brake valve device having an application position for reducing brake pipe pressure and a release position for connecting said train line reservoir to said brake pipe for charging the brake pipe, valve means operative upon a reduction in pressure in a chamber to supply fluid under pressure from the main reservoir to the train line reservoir, means for supplying fluid under pressure to said chamber, said chamber being connected through a communication to said train line reservoir for providing at one time an increase in pressure in said chamber with that in said train line reservoir, control means responsive to a predetermined increase in pressure in said chamber to operate the valve means to cut off the supply of fluid under pressure to the train line reservoir, and means operative upon a reduction in brake pipe pressure exceeding a certain degree to vent fluid under pressure from said chamber and upon an increase in pressure in the train line reservoir exceeding said predetermined degree but below that in the main reservoir to close the vent from the chamber, and a check valve in the communication between said chamber and said train line reservoir providing for the flow of fluid in the direction of the reservoir and for preventing flow in the opposite direction when the chamber is vented.

23. In a fluid pressure brake system of the type comprising a brake pipe normally charged with fluid under pressure to a certain degree and operative upon a reduction in brake pipe pressure to effect an application of the brakes and upon an increase in brake pipe pressure to charge the brake pipe and to thus effect a release of the brakes, a brake valve device operative to an application position to establish a communication through which fluid under pressure in the brake pipe may be reduced and operative to either one of two release positions to establish a communication through which fluid under pressure may be supplied to the brake pipe, means adapted to control the supply of fluid under pressure to the brake valve device and operative in effecting the release of the brakes in either of said release positions to initially supply fluid to the brake pipe by way of the brake valve device at a higher pressure than normally carried, said means being operatively responsive to reductions in brake pipe pressure when effecting an application of the brakes to be conditioned for operation upon a release of the brakes.

24. In a fluid pressure brake system of the type comprising a brake pipe normally charged with fluid under pressure to a certain degree and operative upon a reduction in brake pipe pressure to effect an application of the brakes and upon an increase in brake pipe pressure to charge the brake pipe and to thus effect a release of the brakes, in combination, a brake valve device operative to an application position to establish a communication through which fluid under pressure in the brake pipe may be reduced and operative to either one or two release positions to establish a communication through which fluid under pressure may be supplied to the brake pipe, means adapted to control the supply of fluid under pressure to the brake pipe and operative to maintain said brake pipe charged with fluid at said certain degree in either one of said two release positions, and other means responsive to reductions in brake pipe pressure when effecting an application of the brakes for causing said means on a subsequent release of the brakes to supply fluid to the brake pipe at higher than said certain pressure.

25. In a fluid pressure brake equipment, in combination, a brake pipe normally charged with fluid under pressure, an engineer's brake valve device operative in a brake applying position to reduce the pressure in the brake pipe to apply the brakes and operative to either one of two brake releasing positions to charge the brake pipe to release the brakes, means adapted at all times to control the supply of fluid under pressure to the brake valve device and operative in either of the releasing positions of the brake valve device to maintain said brake pipe charged with fluid at a given pressure, and other means responsive to reductions in brake pipe pressure in said brake applying position for causing said means on subsequent movement of said brake valve to the brake releasing position to initially supply fluid to the brake pipe at higher than said given pressure.

26. In a fluid pressure brake equipment, in combination, a main reservoir normally charged with fluid under pressure, a brake pipe adapted to be charged with fluid at a chosen reduced pressure from said main reservoir, a supply valve for controlling the supply of fluid under pressure from the main reservoir to the brake pipe, a brake valve device having at least three positions, one for reducing brake pipe pressure to effect an application of the brakes and the other positions for connecting said supply valve to said brake pipe for charging same and to effect a release of the brakes, means controlling the supply valve and operative to effect the operation thereof to limit the pressure of fluid supplied to the brake pipe to said chosen pressure, and other means for controlling said supply valve and operative to effect the operation thereof to limit the pressure of fluid supplied to the brake pipe to a degree lower than normally carried in said main reservoir but higher than said chosen pressure, said other means being responsive to reductions in brake pipe pressure when effecting an application of the brakes.

27. In a fluid pressure brake system, in combination, a brake pipe, an engineer's brake valve device operative in one position to effect a reduction in brake pipe pressure to apply the brakes and operative in each of a plurality of different brake release positions to supply fluid under pressure to charge the brake pipe to effect a release of the brakes, a feed valve device adapted to control the supply of fluid under pressure to the brake pipe and operative in each of the different release positions of the brake valve device for normally maintaining said brake pipe charged with fluid at a chosen pressure, and means responsive to brake pipe reductions when applying the brakes for causing said feed valve device to be effective upon a subsequent release of the brakes to supply fluid to said brake pipe at a pressure higher than that normally carried, said means being operative for limiting the higher pressure.

28. In a locomotive brake equipment, in combination, a main reservoir normally charged with fluid under pressure, a brake pipe adapted to be charged with fluid from said main reservoir, a feed valve device for controlling the supply of fluid under pressure from the main reservoir to the brake pipe, a brake valve device having one position for reducing brake pipe pressure and having a release position and a running position for connecting said feed valve to said brake pipe for charging the brake pipe, said feed valve device comprising a supply portion for controlling the supply of fluid under pressure to the brake pipe in either the release or the running position of the brake valve device, and also comprising a regulating portion subject to the pressure of fluid in the brake pipe for controlling the operation of the supply portion to limit the pressure of fluid supplied to the brake pipe to a predetermined degree less than in the main reservoir, and means responsive to reductions in brake pipe pressure for rendering the regulating portion ineffective to operate the supply portion to limit the pressure of fluid supplied to the brake pipe until a higher pressure of fluid is obtained in the brake pipe.

29. In a fluid pressure brake of the type comprising a brake pipe normally charged with fluid under pressure and a brake valve device operative to an application position to establish a communication through which fluid under pressure in the brake pipe may be reduced and operative to either one of two release positions to establish a communication through which fluid under pressure may be supplied to the brake pipe, in combination, a feed valve device comprising a supply portion and an adjustable regulating mechanism, said supply portion being arranged to control the supply of fluid under pressure to the brake pipe in either of said two release positions of the brake valve device, said regulating mechanism being normally operative to control the supply portion for normally maintaining the brake pipe pressure to a predetermined degree, a fluid pressure operated valve device responsive to reductions in brake pipe pressure to effect operation of said regulating portion so as to cause said supply portion to operate to admit fluid to the brake pipe by way of the brake valve device at a pressure higher than said normal pressure.

30. In a fluid pressure brake equipment of the type comprising a normally charged brake pipe, a feed valve device adapted to control the supply of fluid under pressure to the brake pipe and operative to normally maintain the brake pipe charged with fluid under pressure at a predetermined pressure, a brake valve device having at least two release positions for establishing communications through which fluid under pressure flows from said feed valve device to said brake pipe and having a brake application position in which said communications are closed and fluid under pressure is vented from the brake pipe, means operative to adjust said feed valve device to supply fluid under pressure to the brake pipe by way of the brake valve device with the brake valve device in either of said release positions at a pressure in excess of the pressure of fluid normally carried in the brake pipe, and means responsive to the reduction in brake pipe pressure in effecting an application of the brakes for actuating the feed valve adjusting means.

31. In a fluid pressure brake equipment of the type comprising a brake pipe normally charged to a chosen pressure with fluid under pressure and in which the pressure is reduced to initiate an application of the brakes, a feed valve device comprising a supply valve so arranged as to at all times control the supply of fluid under pressure to the brake pipe and operative to supply fluid under pressure to the brake pipe to normally maintain the brake pipe charged with fluid at said chosen pressure, means operative to adjust said supply valve for operation to supply fluid under pressure to increase the brake pipe pressure above that normally maintained in the brake pipe, a brake valve device having at least two release positions in which communications are established through which fluid under pressure supplied by said valve flows to said brake pipe and also having a brake application position in which said communications are closed and fluid under pressure is vented from the brake pipe, and means operative upon a reduction in brake pipe pressure, in effecting an application of the brakes to actuate the first mentioned means to adjust the supply valve for operation, when the brake valve device is returned to either of said release positions, to increase the brake pipe pressure above that normally carried in the brake pipe.

32. In a fluid pressure brake equipment of the type comprising a brake pipe normally charged to a chosen pressure with fluid under pressure and in which the pressure is reduced to initiate an application of the brakes, a feed valve device adapted at all times to control the supply of fluid under pressure to the brake pipe and operative to normally maintain the brake pipe charged with fluid at said chosen pressure, means operative to adjust said feed valve device for operation to supply fluid under pressure to increase the brake pipe pressure above that normally maintained in the brake pipe, a brake valve device having at least two release positions in which communication is established through which fluid under pressure supplied by said feed valve device flows to said brake pipe and also having a brake application position in which said communications are closed and fluid under pressure is vented from the brake pipe, and means operative upon a reduction in brake pipe pressure, in effecting an application of the brakes, to actuate the first mentioned means to adjust the feed valve device for operation, when the brake valve device is returned to either one of said release positions, to increase the brake pipe pressure above that normally carried in the brake pipe.

33. In a locomotive brake equipment, in combination, a main reservoir normally charged with fluid under pressure, a brake pipe adapted to be normally charged with fluid at a reduced pressure from said main reservoir, a brake valve device having an application position for reducing brake pipe pressure and a release position for connecting said reservoir to the brake pipe for charging the brake pipe, a valve operative upon a reduction in pressure in a chamber to control the supply of fluid under pressure from the main reservoir to the brake pipe by way of the brake valve device when the brake valve device is in release position, means for supplying fluid under pressure to said chamber, control means responsive to a predetermined increase in pressure in said chamber to operate said valve to cut off the supply of fluid under pressure to the brake pipe with the brake valve device in release position, and means operative upon a reduction in brake pipe pressure exceeding a certain degree to vent fluid under pressure from said chamber and upon an increase in pressure in the brake pipe exceeding that normally carried in the brake pipe but below that in the main reservoir to close the vent from the chamber.

34. In a locomotive brake equipment, in combination, a main reservoir normally charged with fluid under pressure, a brake pipe adapted to be normally charged with fluid at a reduced pressure from said main reservoir, a supply valve for controlling the supply of fluid under pressure from the main reservoir to the brake pipe, a brake valve device having a brake application position for reducing brake pipe pressure and a release position for admitting main reservoir fluid from the supply valve to the brake pipe for charging the brake pipe, means controlling the supply valve and operative to effect the operation thereof to limit the pressure of fluid supplied from the main reservoir to the brake pipe by way of the brake valve device with the brake valve device in release position to said normally charged pressure, and other means comprising a cut-in and a cut-out valve for controlling said means and thereby the supply valve, said cut-in valve being responsive to a predetermined reduction in brake pipe pressure for effecting the operation of the supply valve to supply fluid under pressure to the brake pipe, and said cut-out valve being operative when brake pipe is charged to a pressure greater than that normally carried in the brake pipe to cut off the supply of fluid under pressure to the brake pipe.

ANDREW T. GORMAN.

CERTIFICATE OF CORRECTION.

Patent No. 2,273,952.  February 24, 1942.

ANDREW T. GORMAN.

It is hereby certified that error appears in the printed specification of the above numbered patent requiring correction as follows: Page 10, first column, line 24, claim 24, for "one or" read --one of--; and line 47, claim 25, before "releasing" insert --brake--; and that the said Letters Patent should be read with this correction therein that the same may conform to the record of the case in the Patent Office.

Signed and sealed this 3rd day of November, A. D. 1942.

(Seal)

Henry Van Arsdale,
Acting Commissioner of Patents.